US 6,499,753 B2

(12) United States Patent
Irvine et al.

(10) Patent No.: US 6,499,753 B2
(45) Date of Patent: Dec. 31, 2002

(54) VEHICLE RACK AND PINION STEERING

(75) Inventors: Marc A. Irvine, Chesaning, MI (US);
Michael Robert Long, El Paso, TX (US); Joel Edward Birsching, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/802,483

(22) Filed: Mar. 9, 2001

(65) Prior Publication Data

US 2001/0025738 A1 Oct. 4, 2001

Related U.S. Application Data

(60) Provisional application No. 60/188,298, filed on Mar. 10, 2000.

(51) Int. Cl.[7] .............................. B62D 3/12; F16H 19/04
(52) U.S. Cl. ..................... 280/93.514; 180/400; 74/422
(58) Field of Search ................................. 180/400, 426, 180/427, 428; 280/93.514; 74/29, 109, 422

(56) References Cited

U.S. PATENT DOCUMENTS 5,117,705 A * 6/1992 Guasch ........................ 74/422
5,860,323 A * 1/1999 Mizutani et al. ............... 74/422

FOREIGN PATENT DOCUMENTS

| GB | 2035507 | 6/1980 | ............ B62D/3/12 |
| JP | 58105875 | 6/1983 | ............ B62D/3/12 |
| JP | 02124361 | 5/1990 | ............ B62D/3/12 |

* cited by examiner

Primary Examiner—Kevin Hurley
(74) Attorney, Agent, or Firm—Edmund P. Anderson

(57) ABSTRACT

The vehicle rack and pinion steering system has an elongated rack bar. Tie rod connectors are provided on the ends of the bar. A rack gear teeth section is provided on the rack bar in a position parallel to and spaced from the rack axis. A cylindrical bearing surface is on the opposite side of the rack axis from the rack gear teeth section. The bearing surface has a fixed radius and is concentric with the rack axis. The rack section width is at least twice the fixed radius. Secondary bearing contact surfaces join the bearing surface, extend toward the rack gear teeth section and diverge from each other. Contact between the bearing and surface shifts the point of convergence of forces on the rack toward the pitch point.

12 Claims, 3 Drawing Sheets

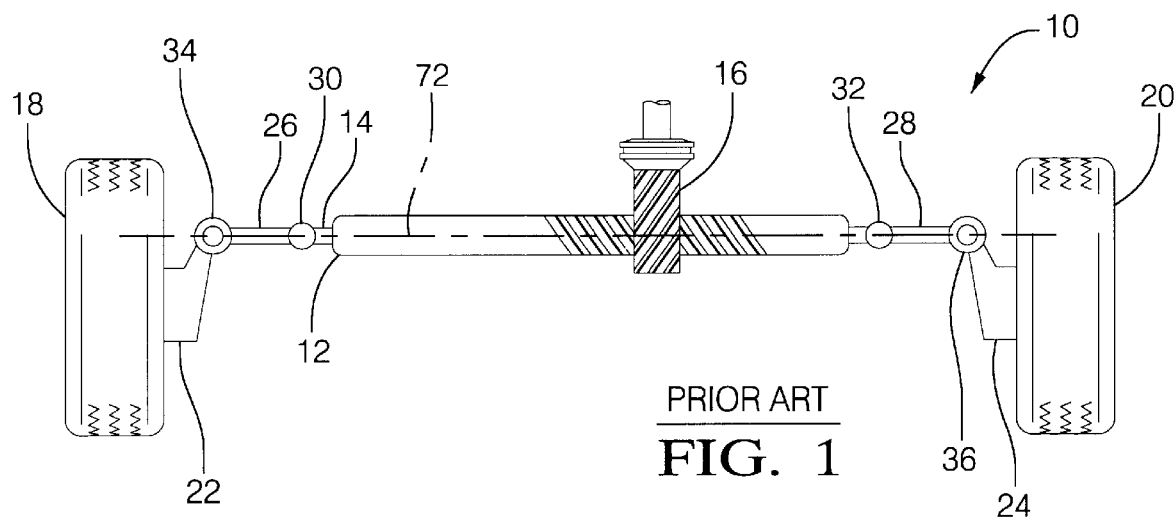
PRIOR ART
FIG. 1
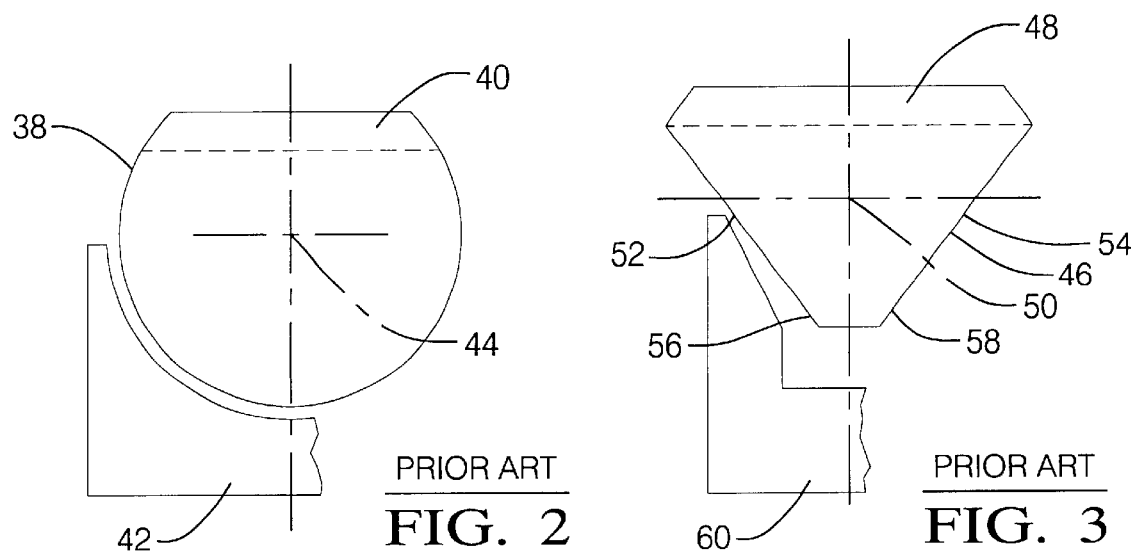
PRIOR ART
FIG. 2
PRIOR ART
FIG. 3
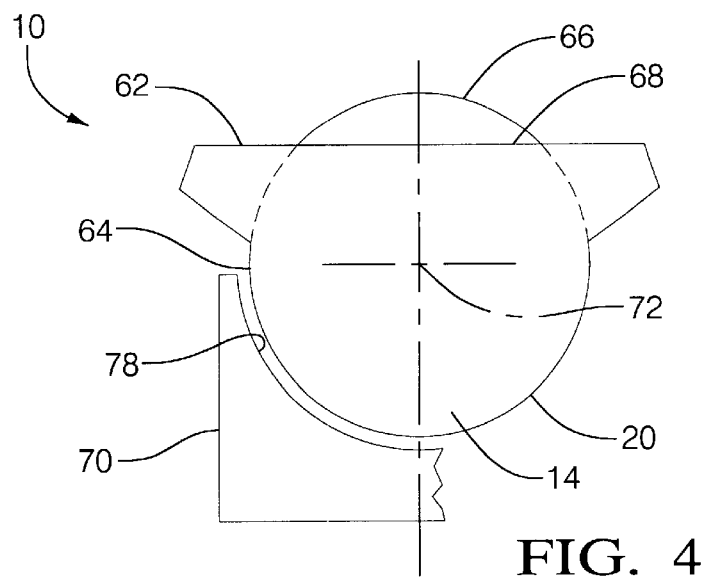
FIG. 4

VEHICLE RACK AND PINION STEERING

CROSS REFERENCE TO RELATED APPLICATIONS

This application is based upon, and claims the benefit of, U.S. Provisional Patent Application No. 60/188,298 filed Mar. 10, 2000, the disclosure of which is incorporated by reference herein in its entirety.

TECHNICAL FIELD

The rack of a vehicle rack and pinion steering system has wide gear teeth and a round rack and rack bearing interface.

BACKGROUND OF THE INVENTION

The loads on the rack of a rack and pinion steering system are applied by one or two tie rods and a driven pinion in both manual steering systems and in electric power steering systems. Each tie rod transmits force from the rack to steered wheels and transmits force from a road surface to the rack. The forces transmitted to and from the rack by the tie rods are generally applied at an angle relative to the rack axis. In steering systems with tie rods attached to each end of a rack, the force applied to one rack end is not the same as the force applied to the other rack end in either magnitude or direction. These forces tend to rotate the rack about the rack axis. The forces also tend to move the rack and rack axis out of alignment with a rack housing axis.

The racks of rack and pinion steering systems have generally been either round or V-shaped. Round racks have teeth formed in a line along one side of an elongated cylindrical member. A bearing with a cylindrical bearing surface supports a rack with a circular cross section. Racks with a circular cross section supported by a bearing surface having a constant radius minimize friction and allow the rack to instantaneously reach equilibrium during pinion rotation. Friction loads on the rack and noise are both minimized. However a circular rack has narrow teeth with minimal load carrying capacity. The load carrying capacity can be increased by increasing the diameter of a round rod. A rod with an increased diameter has an increased weight and increased cost.

Racks with a V-shape have wider teeth. Wider teeth have increased load carrying capacity for a given rod cross section area. The loads exerted upon the V-shaped surfaces by rack support bearings due to rack rotation tend to be concentrated thereby increasing wear. There is also lash between the rack and the V-shaped bearing. This lash results in noise when the loads tending to rotate the rack are reversed.

SUMMARY OF THE INVENTION

The vehicle rack and pinion steering system includes an elongated rack bar having a first end and a second end. A first tie rod connector is on the first end and a second tie rod connector is on the second end. A rack axis passes through the first end and the second end. At least one bearing contact surface on the elongated bar extends at least a portion of the distance from the first end to the second end. The at least one bearing contact surface is an arc about the rack axis and has a substantially fixed radius. A plurality of rack gear teeth are integral with the elongated rack bar and are on the opposite side of the rack axis from the at least one bearing contact surface. The width of the plurality of rack gear teeth, transverse to the rack axis, is at least twice the substantially fixed radius.

BRIEF DESCRIPTION OF THE DRAWINGS

Presently preferred embodiments of the invention are disclosed in the following description and in the accompanying drawings, wherein:

FIG. 1 is a schematic view of a vehicle rack and pinion steering system;

FIG. 2 is a schematic cross sectional view of a prior art round rack and a rack bearing with a portion of the rack bearing broken away and with exaggerated clearances between the rack and rack bearing;

FIG. 3 is a schematic cross sectional view of a prior art V-shaped rack and rack bearing with a portion of the rack bearing broken away and with exaggerated clearances between the rack and rack bearing;

FIG. 4 is a schematic sectional view of the rack and rack bearing with exaggerated clearances between the rack and rack bearing and with a portion of the rack broken away;

DETAILED DESCRIPTION OF PREFERRED EMBODIMENT

Figure 5:
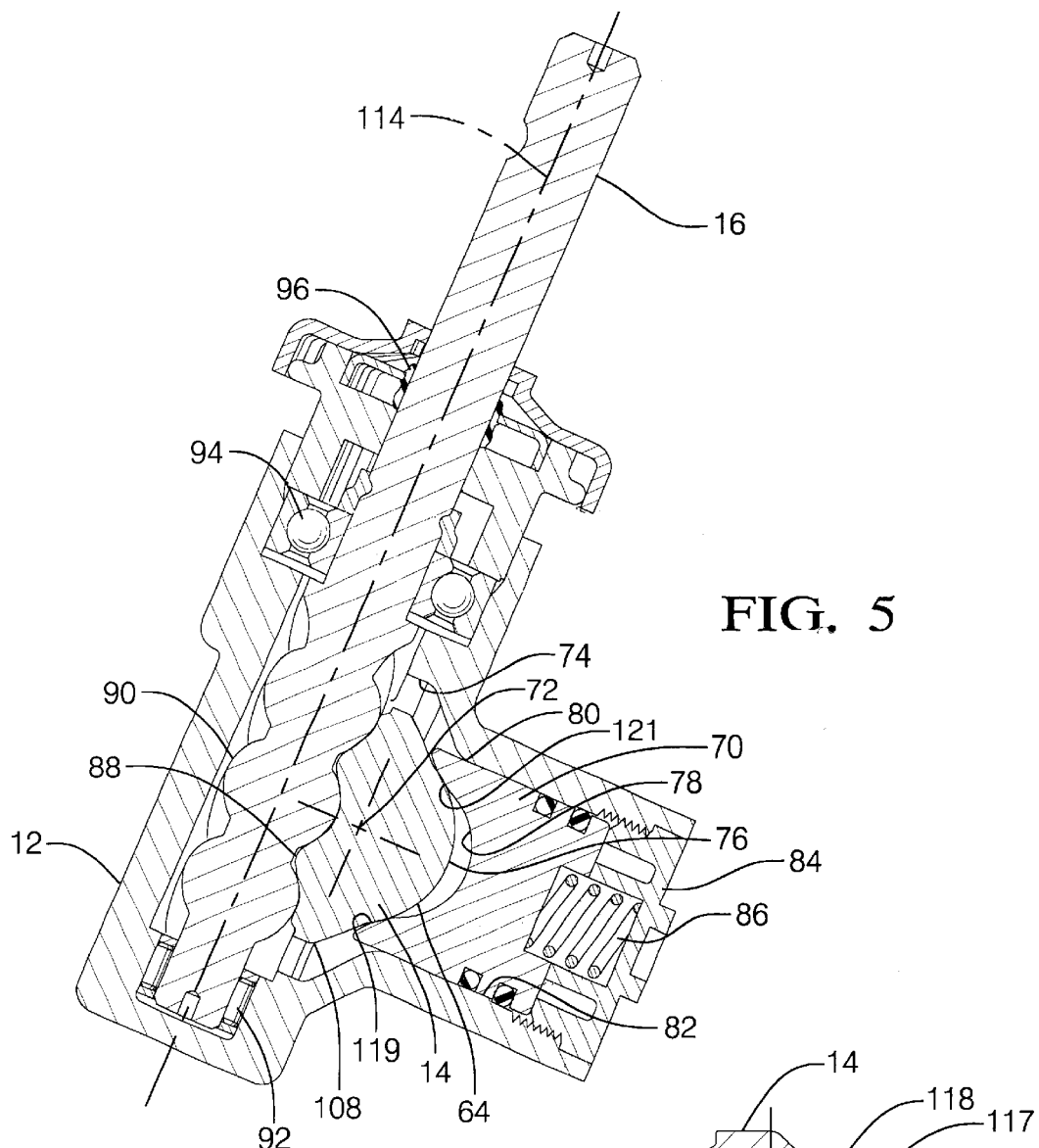
FIG. 5 is a sectional view of the rack housing, rack, pinion and bearing support.

The rack and pinion steering system 10 as shown in FIG. 1 includes a rack and pinion housing 12, a steering rack 14 slideably mounted in the housing, and a pinion 16 journaled in the housing and in mesh with the rack. The pinion 16 is rotated by a steering wheel or a controller in the case of a rear axle in a quad steer steering system, to move the rack 14 relative to the housing 12. The axis of the pinion 16 as shown in FIG. 1 is perpendicular to the axis of the rack 14. Some rack and pinion steering systems currently employed on motor vehicles have a pinion axis that is at an acute angle relative to the rack axis. Steered wheels 18 and 20 support a vehicle. The steered wheels 18 and 20 are journaled on steering knuckles 22 and 24. The steering knuckles 22 and 24 are attached to a vehicle for pivotal movement about a generally vertical axis. Tie rods 26 and 28 are connected to the rack 14 by inner ball joints 30 and 32 and to the steering knuckles 22 and 24 by outer ball joints 34 and 36.

The round rack 38, shown in FIG. 2, has rack teeth 40 that are somewhat shorter than the diameter of the rack. The rack bearing 42 holds the rack teeth 40 in mesh with the pinion. The rack bearing 42 also permits the rack 38 to pivot about the rack axis 44. Meshing engagement between the rack teeth 40 and the pinion limits pivotal movement of the round rack 38 about the rack axis 44.

The V-shaped rack 46, shown in FIG. 3, has rack teeth 48 that are as long as the width of the rack. Rotation of the V-shaped rack 46 about its axis 50 in a counter clockwise direction, as seen in FIG. 3, moves rack areas 52 and 58 into contact with a rack bearing 60. Rotation of the rack 46 clockwise about its axis 50 moves rack areas 54 and 56 into contact with the rack V-shaped bearing 60. These rotational movements of the V-shaped rack 46 about its axis 50 generate noise and place large loads on the contact surfaces between the rack and bearing 60. These large loads increase frictional forces and wear.

The steering rack 14, as shown in FIGS. 4, 5, 6 and 7 is a hybrid rack with wide gear teeth and a round back bearing surface. FIG. 4 schematically illustrates the rack tooth profile 62 that is wider than the diameter of the cylindrical base 64. The end 66 of the steering rack 10 that extend out of one end of the rack and pinion housing 12 is cylindrical. The rack teeth profile 62 has an upper surface 68 that extends from the cylindrical end 66 to the other rack end. A bearing 70 permits limited rotation of the steering rack 10, about the rack axis 72, due to loads exerted on the rack.

The steering rack 14 as shown schematically in FIG. 4 has a rack tooth profile 62 and a cylindrical base 64. At least one end of the rack 14 is a cylindrical end 66 without gear teeth. The width of the rack tooth profile 62 exceeds the diameter of the cylindrical end 66 thereby increasing the length of the rack teeth. A bearing 70 engages the cylindrical base 64 and permits rotation of the rack 14 about the rack axis 72 due to loads exerted on the rack by the pinion 16 and the tie rods 26 and 28.

The rack and pinion steering system 10 in which the hybrid rack 14 is installed is shown in FIG. 5. The pinion 16 is journaled in the rack and pinion housing 12 by a roller bearing 92 and ball bearing 94. A shaft seal 96 is provided to retain lubricant for the bearing 94 and to keep dirt and other contaminates from the bearing 94. The bearing 70 is slideably supported in a bore 82 closed by an end cap 84. A spring 86 biases the bearing 70 constantly into engagement with the round bearing surface 76 of the rack 14. Urging the bearing 70 toward the rack 14 also urges the rack toward the pinion 16 and maintains the rack teeth 88 in mesh with the pinion gear teeth 90. The hybrid steering rack 14, which is shown in more detail in FIGS. 6, 7 and 8, has a first end 100 with a first tie rod connector 102 and second end 104 with a second tie rod connector 106. A cylindrical section 66 of the steering rack 14 extends from the first end 100 to the rack gear teeth section 108. The gear teeth section 108 has an inner tooth section end 110 and an outer tooth section end 112. The second end 104 of the steering rack 14 with a second tie rod connector 106 is integral with the outer tooth section end 112.

Figure 8:
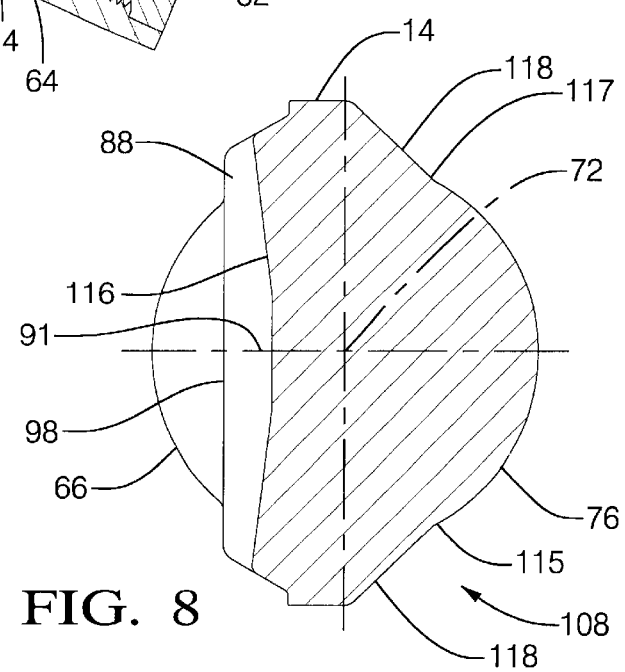
FIG. 8 is a sectional view of the rack taken along line 8—8 and FIG. 6.
Figure 6:
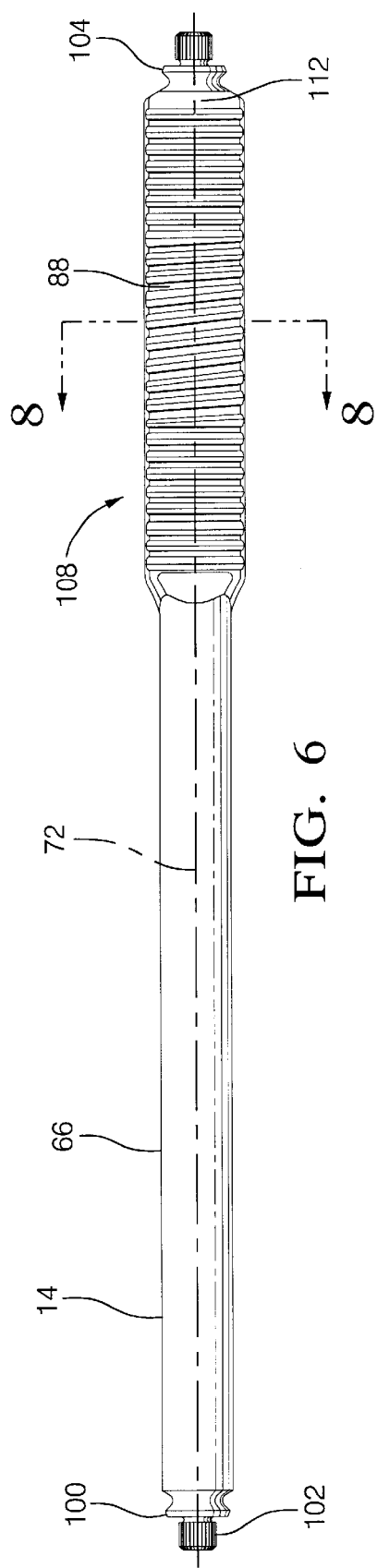
FIG. 6 is a plan view of the rack.
Figure 7:
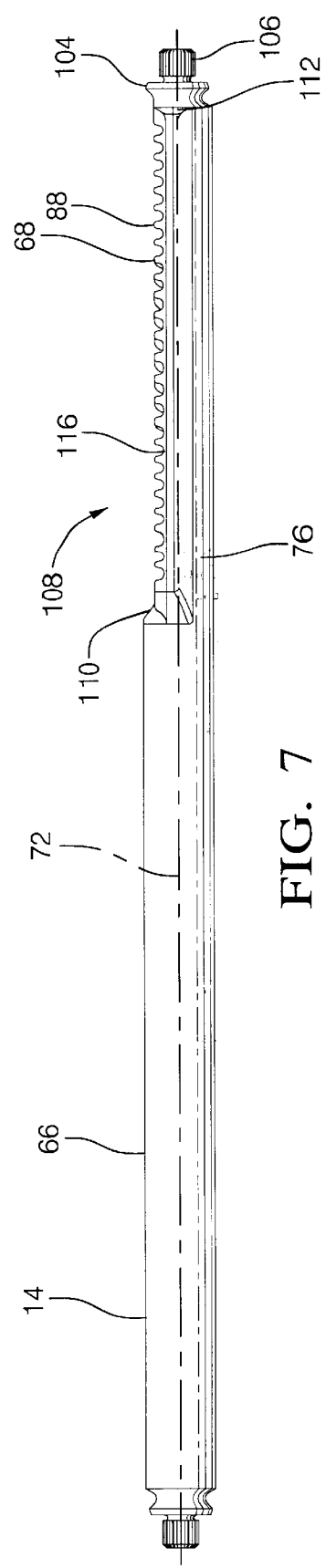
FIG. 7 is an elevational view of the rack.

The gear teeth section 108 has a plurality of rack gear teeth 88. A variety of tooth types can be employed for the gear teeth 88. The gear teeth 88, as shown in FIGS. 5, 6, 7 and 8, provide a variable gear ratio and mesh with a pinion 16 having a pinion axis 114 that crosses the rack axis 72 at an acute angle. The pinion gear teeth 90 are helical teeth. The roots 116 of the gear teeth 88 are arcuate as indicated in FIG. 8. Tooth types other than those described above can be used.

The bearing surface 76 on the gear teeth section 108 has a constant radius about the rack axis 72. The bearing surface 76 extends a little more than 90 degrees about the rack axis 72. Flat surfaces 118 extend upward and outward at an angle of about 45 degrees from the upper ends of the bearing surface 76. The flat surfaces 118 intersect the bearing surfaces 118 along first or second lines 115 and 117 that are parallel to the rack axis 72. Ideally the axis of the bearing surface 76 is above the rack axis 72 and on or near the pitch line of the rack teeth 88 and the pitch circle of the pinion gear teeth 90 when the bearing 70 is exerting substantial force on the rack 14. In this position forces exerted on the rack 14 by the bearing 70 would act on the pitch point and forces tending to rotate the rack would also act on the pitch point 91 shown in FIG. 8. The bearing 70 as shown in FIG. 5 has two rack contact surfaces 119 and 121. These contact surfaces 119 and 121 contact the cylindrical bearing surface 76 adjacent to the flat surfaces 118. The bearing surface 78 on the bearing 70 is spaced from the rack bearing surface 76 between the rack contact surfaces 119 and 121. In the position shown in FIG. 5 the rack 14 can be rotated about the axis 72 in response to a relatively small force. The relatively small force rotates the rack 14 about the axis 72. An increased force on the rack 14 moves one of the bearing surfaces 119 or 121 into contact with a flat surface 118 and the effective location of the application of force on the rack 14 by the bearing 70 is moved toward the rack pitch line. This increased force on the rack 14 also moves the rack axis 72 relative to the rack and pinion housing 12. It is difficult to position the center of the effective bearing surface on the pitch line. When the rack 14 and pinion 16 have a variable ratio, the pitch line and the pitch point 91 change positions. Rack gear teeth 88, that are formed by a forging process, may have a change in the shape and position of the bearing surface 76. With a forged rack gear teeth section 108, the center of the bearing surface 76 is between the rack axis 72 and the tips 98 of the rack gear teeth 88. However, not all rack gear teeth sections 108 are forged. Even with machined rack gear teeth 88 and pinion gear teeth 90, variations in the shape of rack and pinion teeth and part dimensions with vary the location of the pitch point.

The rack and pinion steering system 10, as described above, has wider gear rack teeth 88 relative to the rack diameter. The wider rack gear teeth 88 provide more gear contact surface and an increased load carrying capacity for a given size and weight rack. The rack bearing surface 76 and the bearing 70 permit the rack 14 to oscillate about the rack axis 72 in response to normal steering loads. Larger forces tending to rotate the rack 14 are resisted by the rack bearing 70 and are transmitted to a point of convergence between the axis 72 and the pitch point. The rack bearing surface 76 and the bearing 70 permit the rack 14 to oscillate about the rack axis 72 in response to normal steering loads. Larger forces tending to rotate the rack 14 about the rack axis 72 are resisted by the rack bearing 70 and are transmitted to the pitch point 91 or a position near the pitch point. The rack bearing surface 76 and the bearing 70 cooperate to reduce noise and vibrations.

Obviously, many modifications and variation of the present invention are possible in light of the above teachings. It is, therefore, to be understood that within the scope of thee appended claims, the invention may be practiced otherwise than as specifically described. The invention is defined by the claims.

What is claimed is:

1. A vehicle rack and pinion steering system comprising:
    an elongated rack bar having a first end and a second end;
    a first tie rod connector on the first end and a second tie rod connector on the second end;
    a rack axis passing through the first end and the second end;
    at least one bearing contact surface on said elongated rack bar that extends at least a portion of the distance from the first end to the second end and wherein said at least one bearing contact surface is an arc about the rack axis and wherein the arc has a substantially fixed radius and extends at least 90° about the rack axis;
    a plurality of rack gear teeth integral with said elongated rack bar and on the opposite side of the rack axis from said at least one bearing contact surface; and
    wherein the width of the plurality of rack gear teeth transverse to the rack axis is at least twice said substantially fixed radius.

2. A vehicle rack and pinion steering system as set forth in claim 1 wherein the plurality of rack gear teeth are formed on a rack gear teeth section of said elongated rack bar and have an inner teeth section end and an outer teeth section end; and the at least one bearing contact surface extends at least from the inner teeth section end to the outer teeth section end.

3. A vehicle rack and pinion steering system as set forth in claim 2 wherein the elongated rack bar has a cylindrical section that is concentric with the rack axis and extends from the first end of the elongated rack bar to the inner teeth section end.

4. A vehicle rack and pinion steering system as set forth in claim 1 including a first secondary bearing contact surface on said elongated rack gear teeth section that joins the at least one bearing contact surface along a first line parallel to the rack axis, extends from the at least one bearing contact surface toward the plurality of rack gear teeth, and extends from an inner teeth section end to an outer teeth section end;
   a second secondary bearing contact surface on said elongated rack bar that joins the at least one bearing contact surface along a second line parallel to the rack axis, extends from the at least one bearing contact surface toward the plurality of rack gear teeth, and extends from the inner teeth section end to the outer teeth section end; and
   wherein the first and second secondary bearing contact surfaces cooperate with the at least one bearing contact surface to shift a point of convergence of forces exerted on the elongated rack bar from the rack axis toward a pitch point.

5. A vehicle rack and pinion steering system as set forth in claim 4 wherein the first secondary bearing contact surface is a first flat bearing surface and the second secondary bearing contact surface is a second flat bearing surface.

6. A vehicle rack and pinion steering system comprising:
   an elongated rack bar having a first end and a second end;
   a first tie rod connector on the first end and a second tie rod connector on the second end;
   a rack axis passing through the first end and the second end;
   a rack gear teeth section on said elongated rack bar, parallel to and spaced for the rack axis, and having a plurality of rack gear teeth, an inner tooth section end and an outer tooth section end;
   a cylindrical bearing contact surface, on the opposite side of the rack axis from the rack gear teeth section, that is concentric with the rack axis, extends from the inner tooth section end to the outer tooth section end, and has a fixed radius;
   a rack section width transverse to the rack axis that is at least twice the fixed radius of the cylindrical bearing contact surface;
   a first secondary bearing contact surface on said elongated rack bar that joins the cylindrical bearing contact surface along a second line that is parallel to the rack axis, extends from the cylindrical bearing contact surface toward the rack gear teeth section, and extends from the inner tooth section end to the outer tooth section end;
   a second secondary bearing contact surface on said elongated rack bar that joins the cylindrical bearing contact surface along a second line parallel to the rack axis, extends from the cylindrical bearing contact surface toward the rack gear teeth section, and extends from the inner tooth section end to the outer tooth section end; and
   wherein the first and second secondary bearing contact surfaces diverge from each other as they extend from the cylindrical bearing contact surface toward the rack gear teeth section.

7. A vehicle rack and pinion steering system as set forth in claim 6 wherein the first and second secondary bearing contact surfaces are flat surfaces.

8. A vehicle rack and pinion steering system steering rack control method comprising:
   biasing a rack bearing and said steering rack toward a pinion with at least one rack gear tooth in mesh with at least one pinion gear tooth;
   applying a relative small force, through the rack bearing on the rack along one or more lines that pass through a rack axis;
   moving the point of convergence of a plurality of larger forces exerted on the steering rack by the rack bearing from the rack axis and toward a pitch point.

9. A vehicle rack and pinion steering system comprising:
   an elongated rack bar having a first end and a second end;
   a first tie rod connector on the first end and a second tie rod connector on the second end;
   a rack axis passing through the first end and the second end;
   at least one bearing contact surface on said elongated rack bar that extends at least a portion of the distance from the first end to the second end and wherein said at least one bearing contact surface is an arc about the rack axis and wherein the arc has a substantially fixed radius;
   a plurality of rack gear teeth integral with said elongated rack bar and on the opposite side of the rack axis from said at least one bearing contact surface;
   wherein the width of the plurality of rack gear teeth transverse to the rack axis is at least twice said substantially fixed radius;
   including a first secondary bearing contact surface on said elongated rack gear teeth section that joins the at least one bearing contact surface along a first line parallel to the rack axis, extends from the at least one bearing contact surface toward the plurality of rack gear teeth, and extends from an inner teeth section end to an outer teeth section end;
   a second secondary bearing contact surface on said elongated rack bar that joins the at least one bearing contact surface along a second line parallel to the rack axis, extends from the at least one bearing contact surface toward the plurality of rack gear teeth, and extends from the inner teeth section end to the outer teeth section end; and
   wherein the first and second secondary bearing contact surfaces cooperate with the at least one bearing contact surface to shift a point of convergence of forces exerted on the elongated rack bar from the rack axis toward a pitch point.

10. A vehicle rack and pinion steering system as set forth in claim 9 wherein the first secondary bearing contact surface is a first flat bearing surface and the second secondary bearing contact surface is a second flat bearing surface.

11. A vehicle rack and pinion steering system as set forth in claim 9 wherein the plurality of rack gear teeth are formed on a rack gear teeth section of said elongated rack bar and have an inner teeth section end and an outer teeth section end; and
   the at least one bearing contact surface extends at least from the inner teeth section end to the outer teeth section end.

12. A vehicle rack and pinion steering system as set forth in claim 11 wherein the elongated rack bar has a cylindrical section that is concentric with the rack axis and extends from the first end of the elongated rack bar to the inner teeth section end.

* * * * *